June 15, 1965 F. J. CALLAHAN ETAL 3,189,046
POPPET CHECK VALVE
Filed Nov. 9, 1962 2 Sheets-Sheet 1

INVENTORS.
FRANCIS J. CALLAHAN &
BERNARD J. GALLAGHER
BY
*Fay & Fay*
ATTORNEYS

June 15, 1965   F. J. CALLAHAN ETAL   3,189,046
POPPET CHECK VALVE
Filed Nov. 9, 1962                                   2 Sheets-Sheet 2

INVENTORS.
FRANCIS J. CALLAHAN &
BERNARD J. GALLAGHER
BY
*Fay & Fay*
ATTORNEYS

United States Patent Office 3,189,046
Patented June 15, 1965

3,189,046
POPPET CHECK VALVE
Francis J. Callahan, Chagrin Falls, and Bernard J. Gallagher, Cleveland Heights, Ohio, assignors to Nuclear Products Company, Cleveland, Ohio, a corporation of Ohio
Filed Nov. 9, 1962, Ser. No. 236,630
10 Claims. (Cl. 137—515.7)

This invention relates to poppet check valves adapted for use in automatically controlling uni-directional fluid flow.

*The motivating problems*

For a number of years the valve industry has attempted to design a valve of the poppet check type having the characteristics of simplicity of design and convenience of size for the purposes of commercial feasibility, and at the same time having those operational attributes necessary for satisfactory trade acceptance. While a large number of different designs has been proposed, none has been found entirely satisfactory, either from the standpoint of the purchaser or from that of the manufacturer.

An ever present problem facing industry and common among check valves of the ball type has been that of chatter. In order to overcame the chatter problem, it has been proposed to employ a poppet as a flow control means rather than the well-known ball. This proposal, although providing a solution to chatter, creates at the same time a number of new problems which need to be solved if the desired ends of feasibility and trade acceptance are to be attained.

It has been difficult in connection with poppet type check valve known designs to hold the outside diameter as well as the length to a conveniently small size, with the result that these valves were not as compact as desired. The inability to maintain small dimensional characteristics was caused in part by the fact that several sealing rings were required to provide adequate protection against leakage. With the use of plural sealing rings, it was necessary to provide plural grooves, and therefore additional body material was required with the result that the valve is both greater in length and in diameter. Additionally, of course, the provision of several grooves for receiving sealing rings necessitated more machining than was desirable and therefore increased the cost factor. Some embodiments sought to overcome the problem by a unitary seal; however, the various methods of holding the seal served to constrict the normal flow passage, prove inadequate from the seating standpoint and increase the cost of manufacture while still failing to obviate the undesirable characteristics of their predecessors.

A further problem which has often been encountered in poppet check valves has to do with pressure drop resulting from irregular and uneven flow through the valve. Prior to this time, the poppet members have been cylindrical in form with the side walls of the cylindrical poppet being provided with a number of openings generally perpendicular to the axis of the cylinder. Because of this configuration, the fluid passing through the valve was unable to flow smoothly from the inlet through the holes in the poppet and subsequently through the outlet. The natural result of this uneven flow was a pressure drop across the valve of very undesirable magnitude.

In valves where the sealing seat has to be held on the inner diameter, the attendant constriction in the flow path causes unwanted pressure drops. Ideally, the diameter of the flow path should be as near uniform as possible through the valve, with any constriction being minimized axially to reduce the severity in pressure drop to an absolute minimum.

In an attempt to remedy this situation, a number of very bulky valves were proposed with some degree of success. However, the bulkiness of the proposed valves rendered them more expensive, harder to handle and install and were, of course, very space consuming.

As a further liability, a great number of heretofore known check valve designs have contemplated the use of a substantial number of elements. Attendant to the utilization of elements in large numbers are the factors of increased costs of production, maintenance and materials. Increases of this sort are undesirable, if not completely unsatisfactory.

*The objects and the solution*

It is an object of this invention to provide a poppet check valve having simplicity of design for the purposes of ease of maintenance, reliability of performance and optimization of costs.

It is a further object of this invention to provide a poppet check valve which satisfactorily guards against leakage by employing but a single sealing ring.

It is a still further object of this invention to provide a poppet check valve which employs a single sealing ring, not only as a seat for the poppet member, but also as a means for preventing leakage between the halves of the valve body.

It is another object of this invention to provide a poppet check valve which includes a poppet member so designed as to allow smooth flow through the valve, thereby to impart to the same, low pressure drop characteristics.

It is a further object of this invention to provide a novel seat for cooperation with a poppet member which minimizes the constriction in the flow path.

It is a further object of this invention to provide a novel manner of holding the single seal means so as to reduce pressure drop while minimizing differential areas exposed in the open and closed positions.

It is a still further object of this invention to provide a resilient seat for the poppet member which will be rigidly backed to preclude the poppet member extending therethrough when back pressure becomes excessive, thereby insuring opening at predetermined pressures.

It is a still further object to provide a poppet check valve which will have a minimized constricted path on cracking.

It is another object of this invention to provide a poppet check valve which may be quickly and easily modified for a variety of opening pressures.

Other and further objects of the invention will be apparent from the detailed description to follow.

The instant invention provides a practical and realistic approach to the solution of the various problems discussed hereinabove. Within the contemplation of the invention is the maximum usage of materials through the utilization of a single sealing ring, both for preventing leakage between the valve body halves and for the seating of the poppet member. In this manner, the dimensions of a valve constructed in accordance with the invention may be reduced in magnitude with respect to the equivalent dimensions of hitherto known valves of the same type. Because of the particular sealing arrangement employed in connection with a valve of this invention, it is possible to optimize production and material costs.

Further, a valve constructed in accordance with this invention employs a poppet member which is designed in a manner to allow smooth fluid flow and thereby to impart extremely desirable pressure drop characteristics without recourse to an increase in the over-all size.

The valve of this invention allows high uni-directional flow at a minimum pressure drop.

By virtue of the relatively small number of component parts employed in the construction of a valve according to this invention, maintenance and construction problems are measurably reduced with attendant cost reductions. In addition, where a small number of component parts is employed, the probability of failures is greatly decreased and the dependability or reliability of the valve construction is greatly increased.

*Description*

Turning now to the drawings.

Referring now more specifically to the drawings, we have illustrated a poppet check valve 1 which includes a body 2 comprised of male and female body halves or body forming members 3 and 4, respectively. The body forming members 3 and 4 are provided at their free ends with suitable means 6 and 7 for connection to fluid lines 8 and 9. For illustrative purposes, we have shown the means 6 and 7 as being the well-known compression type couplings, but of course this need not necessarily be the case.

Figure 4:
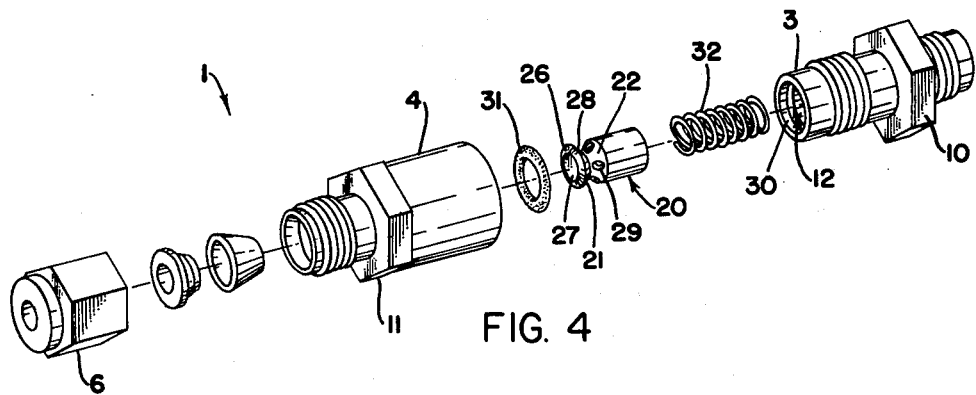
FIG. 4 is an exploded isometric view of a valve embodying the principles of the invention.

As seen in FIG. 4, tool pads 10 and 11 may be provided on the body forming members 3 and 4, if desired, in order to increase the ease with which these members may be threadedly interconnected.

The male body forming member 3 is illustrated as being provided with a stepped diameter bore 12 in which the enlarged portion 13 is generally coaxially aligned with the reduced portion 14 and joined thereto by means of an annular shoulder 15 of generally conical form.

In similar manner, the female body forming member 4 is provided with a stepped diameter bore 16 in which the enlarged portion 17 is joined to the reduced portion 18 by means of a radially extending annular shoulder 19, portions 17 and 18 being coaxially aligned with one another. An seen in FIGS. 1 and 2, the bore 16 in the female body forming member 4 and the bore 12 in the male body forming member 3 are generally coaxially aligned with one another when the members are threadedly interconnected. The enlarged portion 17 of the bore in body forming member 4 is slightly larger in diameter than the external diameter of the forward end of the male body forming member 3 is order that the same may be received therein.

A poppet member 20 is slidably received within the enlarged portion 13 of the bore 12 in the male body forming member 3. The poppet 20 is generally cylindrical in form and is provided with a circumferentially extending constriction formed by conical oppositely tapered walls 21 and 22 located near the end of the poppet opposed to the portion 18 of the bore 16. A longitudinally directed stepped diameter bore 23 extends partly through the poppet and the enlarged portion of the bore is joined to the reduced portion by means of a radially extending shoulder 24. A conical end wall 25 closes the portion of the bore 23 opposed to the portion 18 of the bore 16 in the female body forming member 4.

Figure 5:
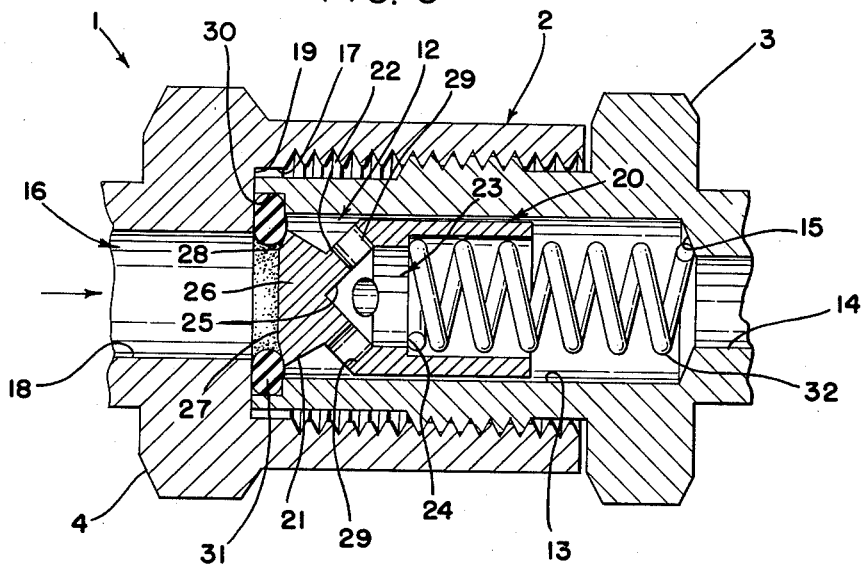
FIG. 5 is an enlarged cross-sectional view of the assembled valve with the poppet in the closed or seated position.

As will be observed from an examination of the drawings, the poppet 20 is provided with a button-like nose member 26 having an end face 27 substantially perpendicular to the axis thereof and opposed to the portion 18 of the bore 16 in the female body forming member 4. The button-like nose member 26 is bevelled at its marginal edges to form a generally conical seating wall 28 converging towards the left, as viewed in FIGS. 2 and 5, for example. The external diameter of the nose member 26 at its largest point is slightly smaller than that of the remainder of the poppet.

A plurality of apertures 29 are formed in the wall 22 in order to allow direct communication between the bore 23 of the poppet and the circumferentially extending constricted portion formed by the walls 21 and 22.

An interior groove 30 is formed in the end portion of the male body forming member 3 opposed to the radial shoulder 19 in the female body forming member 4. A suitable annular sealing ring 31 is received within the groove 30 and sealingly abuts the shoulder 19 thereby to prevent leakage from the bore 16 outwardly between the body forming members 3 and 4. It will be understood, of course, that the seal ring receiving groove would be provided in the female body forming member as an acceptable alternative to the illustrated embodiment.

The inner diameter of the sealing ring 31 is slightly larger than the diameter of the portion 18 of the bore 16 in the free state and is somewhat smaller than the diameter of the nose member 26 at its largest point when squeezed. By this arrangement, the conical seating wall 28 of the nose member 26 of the poppet, when the valve is in the closed position, abuts or seats against the sealing ring 31 to prevent flow of fluids through the valve.

Suitable spring biasing means 32 is received within the bore 23 of the poppet and engages at one end the radial shoulder 24 in the poppet and at the other end the conical shoulder 15 in the fluid passageway 12. In the absence of the adequate pressure on the face 27 of the nose member 26, the spring biasing means 32 holds the conical wall 28 in firm seating engagement with the sealing member 31.

Figure 6:
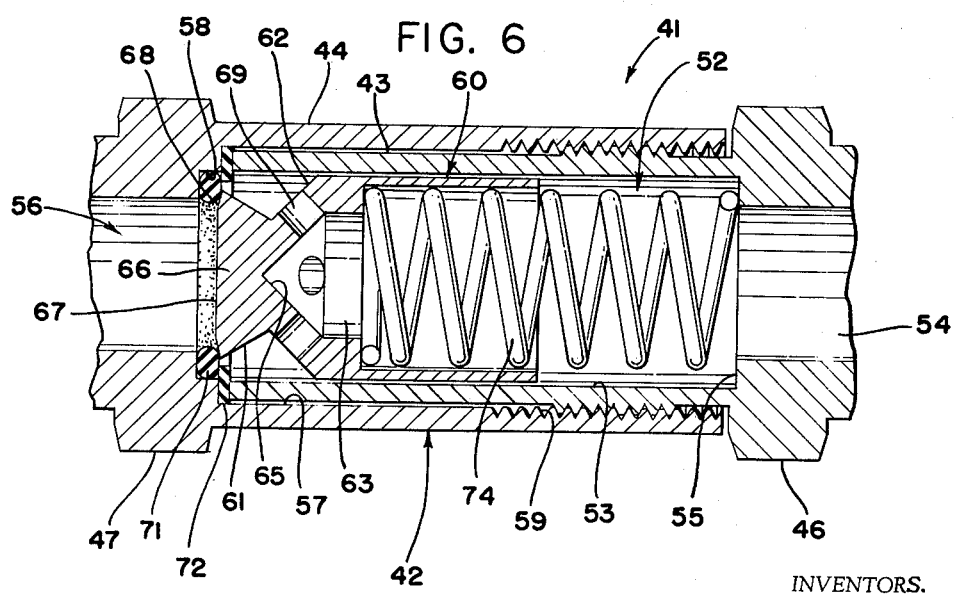
FIG. 6 is a modified form of the valve illustrating in cross section an alternative manner of holding the seal.

Referring now to FIG. 6, a modified form of the poppet check valve is indicated at 41, which comprises a body 42 including male and female body halves or body forming members 43 and 44, respectively. The body forming members 43 and 44 are provided at their free ends with suitable tool pad means 46 and 47 in order to increase the ease with which these members may be threadedly interconnected. The body forming member 43 is provided with a stepped bore 52 in which the enlarged portion 53 is generally coaxially aligned with the reduced portion 54 and joined by means of an annular shoulder 55.

In a similar manner, the female body forming member 44 is provided with a stepped diameter bore 56 in which the enlarged portion 57 is joined to the reduced portion 56 by means of a counterbored portion 58 of reduced diameter with respect to the bore 56. The bore 56 in the female body forming member 44 and the bore 52 in the male body forming member 43 are generally coaxially aligned with one another when the members are threadedly interconnected. The enlarged bore 57 in the female body forming member 42 is slightly larger in diameter than the external diameter of the forward end of the male body forming member in order that the same may be received therein and joined by suitable means, such as the thread means indicated at 59.

A poppet member 60 is slidably received within the enlarged portion 53 of the bore 52 in the male body forming member 43. The poppet 60 is generally cylindrical in form and is provided with a circumferentially extending constriction formed by the conical oppositely tapered walls 61 and 62 located near the end of the poppet opposed to the bore 56. A stepped axial bore 63 extends partly through the poppet terminating in a conical end wall 65.

As is evident from an examination of the drawings, the poppet 60 is provided with a button-like nose member 66 and has an end face 67 which is substantially perpendicular to the axis thereof. The button-like nose member 66 is lightly chamfered at its marginal edges to form a generally conical seating wall 68 converging towards the left as viewed in FIG. 6. The external diameter of the nose member 66 is slightly smaller than the remainder of the poppet body.

A plurality of apertures 69 are formed in the wall 62 in order to allow direct communication between the bore 63 of the poppet 60 and the circumferentially extending constricted portion formed by the walls 61 and 62. The female body forming member 42 is provided with a stepped shoulder 58 to receive a suitable sealing ring 71, such as an O-ring.

The O-ring 71 is held in a manner similar to the embodiment of FIGS. 1 through 5, in that it is gripped between a pair of members. In each case, the members extend slightly inwardly of the cross-sectional axis of the ring in the free state. As the members are drawn up tight, the O-ring, being confined on three sides, extrudes inwardly as seen in the drawings.

In the embodiment of FIG. 6, however, an additional gasket means 72 provides a backing member to assist in holding the O-ring 71 in place. The gasket 72 is analogous in function to the shoulder of the male body forming member in FIG. 5 in that in each instance the grip is obtained by a shoulder means which extends radially inward slightly beyond the cross-sectional axis of the O-ring as noted. As the body members are drawn up tight, as seen in FIGS. 2 through 6, the O-ring is extruded radially inward to form a seat for the poppet member 60. The gasket 72 is clampingly received between the end of the male body forming member and the shoulder 73 in the female body forming member to seal the body members.

Suitable spring biasing means 74 is received within the bore 63 of the poppet and engages at one end the radial shoulder 55 and the poppet member 60 on the opposite end. In the absence of sufficient pressure on the face 67 of the poppet, the force of spring biasing means 74 holds the conical wall 68 in firm seating engagement with the sealing member 71.

*Operation*

In operation, the valve of this invention is simple and efficient. Fluid under pressure is carried through line 8 into portion 18 of the bore 16. Assuming that the pressure of the fluid is of high enough degree to exert sufficient force on the face 27 of the nose member 26 to overcome the force of the spring 32, the poppet 20 will move towards the right as viewed in FIG. 2, thus breaking the seal between the conical seating wall 28 and the sealing member 32. Thereupon fluid passes from the portion 18 of the bore 16 into the portion 13 of the bore 12 and from there around the nose member and through the apertures 29 provided in the wall 22. The fluid which passes through the apertures 29 subsequently passes into the bore 23 of the poppet, as indicated by the arrows in FIG. 2 and from there through the portion 14 of the bore 12 into the line 9.

Figure 1:
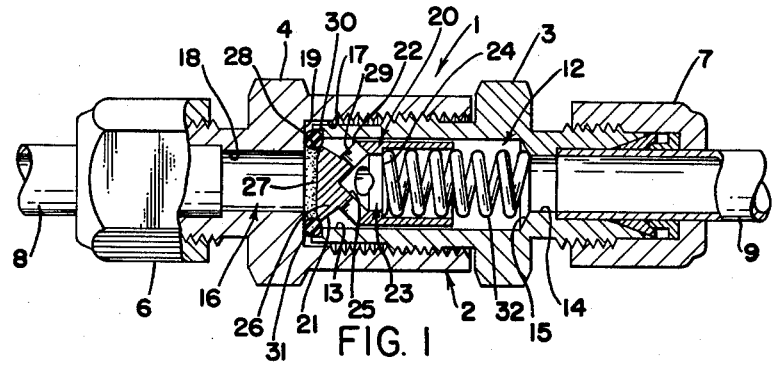
FIG. 1 is a side elevation partly in longitudinal section of a valve constructed in accordance with the teachings of the invention, with the parts in the hand-tight position, and showing the poppet member in the closed position.
Figure 2:
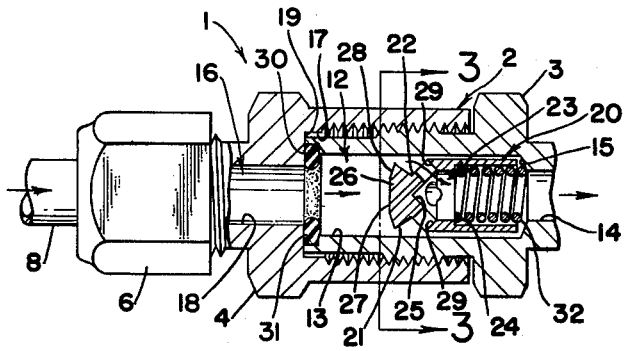
FIG. 2 is a side elevation partly in longitudinal section of a fully assembled valve constructed in accordance with the invention and showing the poppet member in the open position in order to allow fluid flow through the valve.
Figure 3:
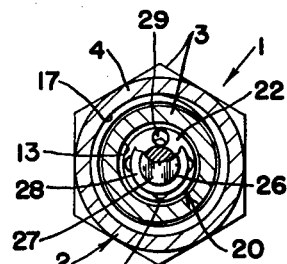
FIG. 3 is a cross-sectional view of the valve taken along line 3—3 of FIG. 2.

When the pressure of the fluid in line 8 is no longer of a magnitude to exert force against the face 27 of the nose member 26 sufficient to overcome the force of the spring 32, the spring will cause the poppet to move to the left, thereby re-establishing the seal between the conical wall 28 and the sealing ring 31, as viewed in FIG. 1. The re-establishment of the seal, of course, stops the flow of fluid through the valve until such time as the pressure in line 8 is again of sufficient magnitude to overcome the biasing force of the spring 32.

As seen in the drawings, the single sealing ring 31 serves as a means not only to prevent leakage between the body forming members 3 and 4, but also as a seat for the nose of the poppet. In this manner, only one sealing member is required to fulfill two separate and distinct sealing functions inasmuch as it prevents leakage of fluid through the valve when the same is closed and from the valve to the exterior.

It is to be appreciated that an additional purpose is served by the novel positioning of the O-ring in that the constricted path through the valve is relatively short. When the poppet member cracks or moves open a slight distance, the flow path between the button head and seal is relatively short, serving to minimize the pressure drop. The button-headed member, being substantially the size of the body member, will not on cracking present a substantially larger area to the pressure so as rapidly to move the poppet member to the right which would tend to overcompress the spring and set up an oscillation-like chatter, while the spring comes to equilibrium. Further, the button-headed member lies against the sealing ring, which is backed by a radial shoulder in the body forming member, so that the poppet member will not extend through the ring. If the poppet were of such a dimension so as to fit within the ring, back pressure along with the spring, would wedgingly force it farther through the ring, which would cause sticking and lack of predictability in opening pressure. The novel manner in which the ring is held is greatly simplified from prior art types and is quite inexpensive from the manufacturing standpoint as contrasted with prior art methods of holding the ring on the inner diameter.

Because of the fact that the apertures 29 are formed at an angle to the axis of the poppet and diverge towards the valve inlet and further because of the fact that the marginal edge of the nose 26 is generally conical in form at 28, a smooth flow through the valve is provided which results in very favorable pressure drop characteristics in that a high flow is permitted with a relatively low pressure drop.

It is, of course, a simple matter to modify the valve for various desired opening pressures by merely changing the spring biasing means 32. In other words, if it is desired to modify the valve for opening at higher pressures, a spring biasing means having a high spring constant is employed. If, on the other hand, a valve is desired which will open at lower pressures, a spring having a low spring constant is utilized. In this manner, the versatility of the valve is greatly increased without the necessity of utilizing complex mechanisms.

Exclusive of the coupling means 6 and 7, the valve illustrated in the drawings consists of but five parts. By virtue of this fact, we are able to provide a valve which is much more dependable than those previously known and much less expensive, both from the standpoint of production and from that of maintenance.

For ease of description, the invention has been disclosed as being included in but one embodiment. It will be immediately apparent to one having but ordinary skill in the art, however, that a considerable number of modifications could be made to the illustrated embodiment without departing from the spirit of the invention. It is, therefore, our desire to be limited only by the scope of the appended claims.

We claim:

1. In a valve device, a female body forming member having a fluid passageway extending therethrough, and an annular radially extending shoulder intermediate the ends of the passageway, a male body forming member having one end portion thereof received within the female body forming member, and removably interlocked therewith to form a valve body, a fluid passageway extending through the male body forming member and being generally coaxial with the fluid passageway in the female body forming member when the male member is received within the female member, said one end portion of the male body forming member, when received within the female body forming member, being closely opposed to the annular radially extending shoulder, a seal ring abuttingly received between said one end portion of the male member and the radially extending shoulder to establish a fluid-tight relationship between the male and female body forming members, a tubular poppet member adjacent the sealing ring and slidably received within the fluid passageway in the male body forming member, the poppet member being closed at one end by means of an end wall extending transverse to the axis thereof, the poppet member further being provided intermediate its ends with a circumferential groove and at least one angulated aperture extending through the walls thereof, said seal ring having radially inner portions thereof projecting into the fluid passageway to provide a seat for the margins of the poppet end wall, said sealing seat on the poppet end wall being of a greater radial dimension than the radially innermost edge of said angulated aperture at the intersection of the outer periphery of said poppet, and spring biasing means normally urging the margins of the end wall of the poppet into seating engagement with said sealing ring.

2. A valve as defined in claim 1 in which the apertures communicate with the groove, the axes of the apertures together diverging in a direction towards the sealing ring.

3. A valve device as defined in claim 1 in which said margins of end wall of the poppet are bevelled in order to provide a generally conical seating surface.

4. A device as defined in claim 1 in which the one end portion of the male body forming member is provided with an annular groove within which the seal ring is received.

5. In a valve device, a female body forming member having a fluid passageway extending therethrough, and an annular stepped shoulder intermediate the ends of the passageway, a male body forming member having one end portion thereof received within the female body forming member, and removably interlocked therewith to form a valve body, a fluid passageway extending through the male body forming member and being generally coaxial with the fluid passageway in the female body forming member when the male member is received within the female member, said one end portion of the male body forming member, when received within the female body forming member, being closely opposed to the annular stepped shoulder, seal means abuttingly received between said one end portion of the male member and the stepped shoulder to establish a fluid-tight relationship between the male and female body forming members, a tubular poppet member adjacent the seal means and slidably received within the fluid passageway in the male body forming member, the poppet member being closed at one end by means of an end wall extending substantially transverse to the axis thereof, the poppet member further being provided intermediate its ends with a circumferential groove and at least one angulated aperture extending through the walls thereof, said seal means having radially inner portions thereof projecting into the fluid passageway to provide a seat for the margins of the poppet end wall, said sealing seat on the poppet end wall being of a greater radial dimension than the radially innermost edge of said angulated aperture at the intersection of the outer periphery of said poppet, and spring biasing means normally urging the margins of the end wall of the poppet into seating engagement with said seal means.

6. The valve of claim 5 wherein the seal means includes an O-ring received in said stepped shoulder, an annular gasket held between said male and female body members and extending inwardly to hold said O-ring in said stepped shoulder.

7. The valve of claim 6 wherein said inside diameter of said annular gasket is greater than the inside diameter of said O-ring.

8. The valve of claim 5 wherein the poppet end wall in the closed position does not extend beyond a plane passed through the cross-sectional axis of the seal means.

9. In a valve device;
a female body forming member having a fluid passageway extending therethrough and an annular stepped shoulder intermediate the ends of the passageway;
a male body forming member having one end portion thereof received within the female body forming member and removably interlocked therewith to form a valve body;
a fluid passageway extending through the male body forming member and being generally coaxial with the fluid passageway in the female body forming member when the male member is received in the female member;
said one end portion of the male body forming member when received in the female body forming member being closely opposed to the annular stepped shoulder;
O-ring seal means abuttingly received between said one end portion of the male member and the stepped shoulder of said female member to establish a fluid tight relationship between the male and female body forming members, with the inner periphery of said seal means being exposed to the fluid in the passageway;
the inner diameter of said O-ring in its natural state being less than the diameter of the passageway in said one end portion of the male member;
a tubular poppet member slidably received within the fluid passageway in the male body forming member;
said poppet member including an end wall extending substantially transverse to the axis thereof, with the radial dimension of said end wall being of a greater dimension than the radially innermost edge of said seal means and substantially less than the radial dimension of the passageway through the portion of said male member abutting said O-ring seal means; and
spring biasing means normally urging said poppet member to a position wherein said end wall engages said seal means with said seal means coacting with said end wall to prevent projection of said end wall through the center of said seal means and thereby prevent substantial frictional contact between the inner periphery of said seal means and said poppet member.

10. The valve of claim 9 wherein the inner diameter of said O-ring seal means in its natural state is larger than the diameter of the adjacent portion of the passageway in said female member with said stepped shoulder extending radially inwardly of the peripheral wall of said passageway in said end portion of said male member thereby providing a greater area for abutment of said O-ring seal means against said stepped shoulder of said female member than on the axially opposed surface on said male member.

References Cited by the Examiner

UNITED STATES PATENTS

| 2,073,112 | 3/37 | Lindinger | 251—361 XR |
| 2,896,663 | 7/59 | Mena | 251—361 XR |
| 2,917,072 | 12/59 | Saville | 137—469 |
| 2,959,188 | 11/60 | Kepner | 137—540 |
| 2,971,090 | 2/61 | Piet. | |
| 3,027,914 | 4/62 | Jones | 137—515.7 |

FOREIGN PATENTS

| 1,004,004 | 3/57 | Germany. |
| 782,594 | 9/57 | Great Britain. |
| 802,441 | 10/58 | Great Britain. |

MARTIN P. SCHWADRON, *Acting Primary Examiner.*